United States Patent
Hegde et al.

(10) Patent No.: US 10,636,176 B2
(45) Date of Patent: Apr. 28, 2020

(54) REAL TIME OVERLAY PLACEMENT IN VIDEOS FOR AUGMENTED REALITY APPLICATIONS

(71) Applicant: Tata Consultancy Services Limited, Mumbai (IN)

(72) Inventors: Srinidhi Hegde, Guragon (IN); Ramya Hebbalaguppe, Guragon (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/265,969

(22) Filed: Feb. 1, 2019

(65) Prior Publication Data
US 2020/0082574 A1   Mar. 12, 2020

(30) Foreign Application Priority Data
Sep. 6, 2018 (IN) .............................. 201821033541

(51) Int. Cl.
*G06T 11/00* (2006.01)
*G06T 3/20* (2006.01)

(52) U.S. Cl.
CPC ............. *G06T 11/00* (2013.01); *G06T 3/20* (2013.01)

(58) Field of Classification Search
CPC .................................................... G06T 19/006
See application file for complete search history.

(56) References Cited

U.S. PATENT DOCUMENTS

| | | | |
|---|---|---|---|
| 6,282,317 B1 | 8/2001 | Luo et al. | |
| 2004/0257477 A1* | 12/2004 | Ikeda | G06T 7/0002 348/725 |
| 2010/0322521 A1 | 12/2010 | Tal et al. | |
| 2011/0287811 A1* | 11/2011 | Mattila | G06K 9/4671 455/566 |
| 2014/0359656 A1 | 12/2014 | Banica et al. | |
| 2015/0262428 A1* | 9/2015 | Tatzgern | G06F 3/011 345/633 |
| 2016/0291690 A1* | 10/2016 | Thorn | H04N 5/232 |
| 2017/0023793 A1* | 1/2017 | Shtukater | G02B 27/0179 |
| 2017/0084072 A1* | 3/2017 | Weitzberg | G06T 15/20 |
| 2019/0206093 A1* | 7/2019 | Chen | G02B 27/017 |

* cited by examiner

*Primary Examiner* — Phi Hoang
(74) *Attorney, Agent, or Firm* — Finnegan, Henderson, Farabow, Garrett & Dunner LLP

(57) ABSTRACT

Textual overlays/labels add contextual information in Augmented Reality (AR) applications. The spatial placement of labels is a challenging task particularly for real time videos. Embodiments of the present disclosure provide systems and methods for optimal placement of contextual information for Augmented Reality (AR) applications to overcome the limitations of occlusion with object/scene of interest through optimally placing labels aiding better interpretation of scene. This is achieved by combining saliency maps computed for each frame of an input video with Euclidean distance between current and previous overall positions for each frame based on an initial overlay position of the label to calculate an updated overlay position for label placement in the video. The placement of overlays is formulated as an objective function that minimizes visual saliency around the object of interest and minimizes the temporal jitter facilitating coherence in real-time AR applications.

12 Claims, 4 Drawing Sheets

REAL TIME OVERLAY PLACEMENT IN VIDEOS FOR AUGMENTED REALITY APPLICATIONS

PRIORITY CLAIM

This U.S. patent application claims priority under 35 U.S.C. § 119 to: India Application No. 201821033541, filed on Sep. 6, 2018. The entire contents of the aforementioned application are incorporated herein by reference.

TECHNICAL FIELD

The disclosure herein generally relates to video analysis, and, more particularly, to systems and methods for real time overlay placement in videos for augmented reality applications.

BACKGROUND

Augmented Reality (AR) with Virtual Reality (VR) is regarded as the 4th wave of technology after Personal Computer (PC), internet, and mobile. In AR, a real world scene is augmented by overlaying virtual information to enable better situational awareness and to enhance human cognition and perception. This contextual information can take the form of, but not limited to, text, 3D objects, GPS coordinates, and audio. Placement of such contextual information is a significant contribution for scene understanding which is a major problem in artificial intelligence. The spatial placement of labels is a challenging task due to constraints that labels (i) are not occluding the object/scene of interest, and, (ii) are optimally placed for better interpretation of scene. The sophisticated state-of-the-art technique for optimal positioning of textual label work only on the images and are often inefficient for real-time performance on devices (e.g., mobile communication devices such as smart phones, tablets and the like).

SUMMARY

Embodiments of the present disclosure present technological improvements as solutions to one or more of the above-mentioned technical problems recognized by the inventors in conventional systems. For example, in one aspect, there is provided a processor implemented method for real time overlay placement in videos for augmented reality applications. The method comprises receiving, in real time, (i) an input video comprising a plurality of frames and an object of interest in the plurality of frames, and (ii) a label for which an initial overlay position is pre-computed for placement on a center frame of the input video; computing, in real time, a saliency map for each of the plurality of frames to obtain a plurality of saliency maps; computing, in real time, for each of the plurality of frames, Euclidean distance between a current overlay position and a previous overlay position based on the initial overlay position of the label to obtain a plurality of Euclidean distances; and calculating, in real time, an updated overlay position of the label for placement in the input video based on the plurality of saliency maps and the plurality of Euclidean distances.

In an embodiment, the updated overlay position of the label may be computed by combining the plurality of saliency maps and the plurality of Euclidean distances.

In an embodiment, the Euclidean distance for each of the plurality of frames is computed for controlling, in real time, temporal jitter in a position of the label to be placed in the input video. In an embodiment, the method may further comprise shifting the label from the initial overlay position to the updated overlay position to minimize occlusion from viewing the object of interest.

In an embodiment, a plurality of pixels corresponding to Euclidean distance between the current overlay position and the previous overlay position that is within a predefined threshold range are selected for shifting the label from initial overlay position to the updated overlay position.

In another aspect, there is provided a system for real time overlay placement in videos for augmented reality applications. The system comprises: a memory storing instructions; one or more communication interfaces; and one or more hardware processors coupled to the memory via the one or more communication interfaces, wherein the one or more hardware processors are configured by the instructions to: receive, in real time, (i) an input video comprising a plurality of frames and an object of interest in the plurality of frames, and (ii) a label for which an initial overlay position is pre-computed for placement on a center frame of the input video; compute, in real time, a saliency map for each of the plurality of frames to obtain a plurality of saliency maps; compute, in real time, for each of the plurality of frames, Euclidean distance between a current overlay position and a previous overlay position based on the initial overlay position of the label to obtain a plurality of Euclidean distances; and calculate, in real time, an updated overlay position of the label for placement in the input video based on the plurality of saliency maps and the plurality of Euclidean distances.

In an embodiment, the updated overlay position of the label is computed by combining the plurality of saliency maps and the plurality of Euclidean distances. In an embodiment, the Euclidean distance for each of the plurality of frames is computed for controlling, in real time, temporal jitter in a position of the label to be placed in the input video.

In an embodiment, the one or more hardware processors are further configured to shift the label from the initial overlay position to the updated overlay position to minimize occlusion from viewing the object of interest. In an embodiment, a plurality of pixels corresponding to Euclidean distance between the current overlay position and the previous overlay position that is within a predefined threshold range are selected for shifting the label from initial overlay position to the updated overlay position.

In yet another aspect, there are provided one or more non-transitory machine readable information storage mediums comprising one or more instructions which when executed by one or more hardware processors causes a method for real time overlay placement in videos for augmented reality applications. The instructions cause receiving, in real time, (i) an input video comprising a plurality of frames and an object of interest in the plurality of frames, and (ii) a label for which an initial overlay position is pre-computed for placement on a center frame of the input video; computing, in real time, a saliency map for each of the plurality of frames to obtain a plurality of saliency maps; computing, in real time, for each of the plurality of frames, Euclidean distance between a current overlay position and a previous overlay position based on the initial overlay position of the label to obtain a plurality of Euclidean distances; and calculating, in real time, an updated overlay position of the label for placement in the input video based on the plurality of saliency maps and the plurality of Euclidean distances.

In an embodiment, the updated overlay position of the label may be computed by combining the plurality of saliency maps and the plurality of Euclidean distances.

In an embodiment, the Euclidean distance for each of the plurality of frames is computed for controlling, in real time, temporal jitter in a position of the label to be placed in the input video. In an embodiment, the instructions when executed by the one or more hardware processors may further cause shifting the label from the initial overlay position to the updated overlay position to minimize occlusion from viewing the object of interest.

In an embodiment, a plurality of pixels corresponding to Euclidean distance between the current overlay position and the previous overlay position that is within a predefined threshold range are selected for shifting the label from initial overlay position to the updated overlay position.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
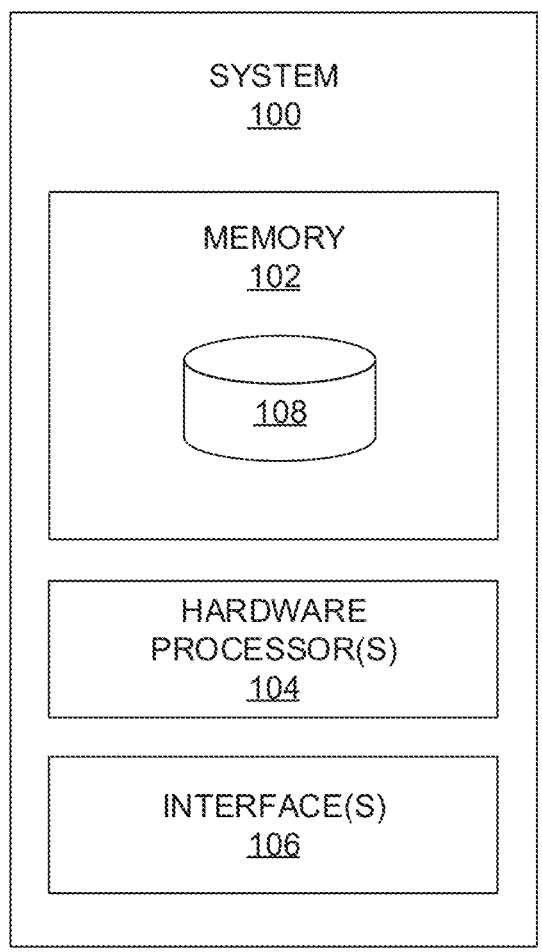
FIG. 1 illustrates an exemplary block diagram of a system for real time overlay placement in videos for augmented reality applications in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

As mentioned above, Augmented Reality (AR) with Virtual Reality (VR) is regarded as the 4th wave of Technology after PC, internet, and mobile. Overlaying virtual information on a real world scene is considered of high importance to enable better situational awareness and to enhance human cognition and perception. Placement of such contextual information is a significant contribution for scene understanding which is a major problem in artificial intelligence.

Some of the applications that relate to optimal placement of text labels are as follows: (i) optimal placement of advertisements in indoor/outdoor scenes and in videos is a crucial advertising strategy for capturing visual attention of viewers, (ii) labels identifying the names of the nearby monuments and buildings help in better situational awareness for tourists, (iii) various conventional applications, provide real-time translations on various operating systems (e.g., an Android® device) by using its camera. It is noted that AR applications on mobile phone aid in performing tasks faster, accurately, efficiently and with low cognitive load. Another example where the optimal overlay placement could be useful is in the situations where soldiers use head mounted devices (HMDs). The overlay of GPS coordinates of members in a battle field map that is shown on HMDs, should not occlude the real view of the scene at a crucial time. Further, optimal placement of subtitles in videos helps in avoiding diversion in focus. Smart label placement helps in making videos interesting by making use of comic style overlay placement.

The placement of these 2D text labels is challenging as the contextual information is overlaid in such a manner that overlays do not occlude the object/scene of interest, and are optimally placed thereby aiding better interpretation. Few research works have discovered that label placement for AR applications is not trivial as the placement needs to work at real-time. For a simple task of placing a label on a static image, the number of possible label positions grows exponentially with the number of items to be labeled. Additional challenges include lack of understanding of cognitive and perceptual issues regarding label placement for AR applications.

Having said all the above, overlay placement around the object/scene of interest has received little focus in the vision community in comparison to object detection and segmentation. Recently, label placement has attracted much attention with the increasing demand in AR applications which overlay textual labels in real-time. There have been related studies of optimal placement of textual labels based on—Geometry based layout and Image-based layouts for rendering the labels, aesthetic rule, and adaptive overlays.

In the Geometric based layout approaches, it has been demonstrated that point feature label placement is an NPhard problem and simulated annealing and gradient descent were proposed as solutions. Image aesthetics based (or Image based layout) approaches were developed to consider the visual aesthetics of computer interfaces as a strong determinant of users' satisfaction. They utilize a general design principle such as spatial layout rules, symmetry, balance among the elements as well as the color schemes and harmony with the use-case of photobook generation. However, the aforementioned approaches work on images and are not suited for real-time camera streams (or real time video streams).

Other few works have focused on image driven view management for AR browsers for placement of labels on video streams that uses a combination of saliency maps and edge maps. It is observed that in such works, few of the major limitations that one encounters when applying this approach to video streams on mobile devices: firstly such techniques are applied dynamically when there is a slight movement of the camera. In case of massive movement, they use a static layout for labels. For AR-based applications, this approach is clearly not feasible. Secondly, implementing visual saliency algorithms involves matrix manipulations which are expensive to compute. This issue becomes especially prominent on mobile devices with limited computational resources and memory. Further, these works and other conventionally known approaches of textual overlays as mentioned above are computationally heavy, and mostly work on images on desktop computer and lack real-time performance and are further not suitable for overlay in videos. Moreover, owing to occlusions, dim light scenarios, scene variations in the live field of view, overlays have their own challenges.

Embodiments of the present disclosure provide systems and methods for strategic placement of contextual labels for AR applications. The system and method of the present disclosure provide a label placement technique that works in real-time, on even low-end android devices such as a smart phone and a tablet. In the present disclosure, label placement is formulated as an objective function parameterized by image saliency and temporal jitter. The present disclosure implements computation of label occlusion over saliency (LOS) score, for measuring the effectiveness of overlay placement.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for real time overlay placement in videos for augmented reality applications in accordance with an embodiment of the present disclosure. The system 100 may also be referred as 'an overlay placement system' and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to information input video, frames, object of interest, label, initial overlay position of the label, label width and height, saliency maps output, Euclidean distance output(s), updated overlay position for placement in the video. More specifically, information pertaining to input video comprising pixel information, current and previous overlay positions for each frame, temporal jitter, predefined threshold range, and the like. In an embodiment, the memory 102 may store one or more technique(s) (e.g., saliency map computation technique(s), Euclidean distance computation technique(s)) which when executed by the one or more hardware processors 104 to perform the methodology described herein. The memory 102 may further comprise information pertaining to input(s)/output(s) of each step performed by the systems and methods of the present disclosure.

Figure 2:
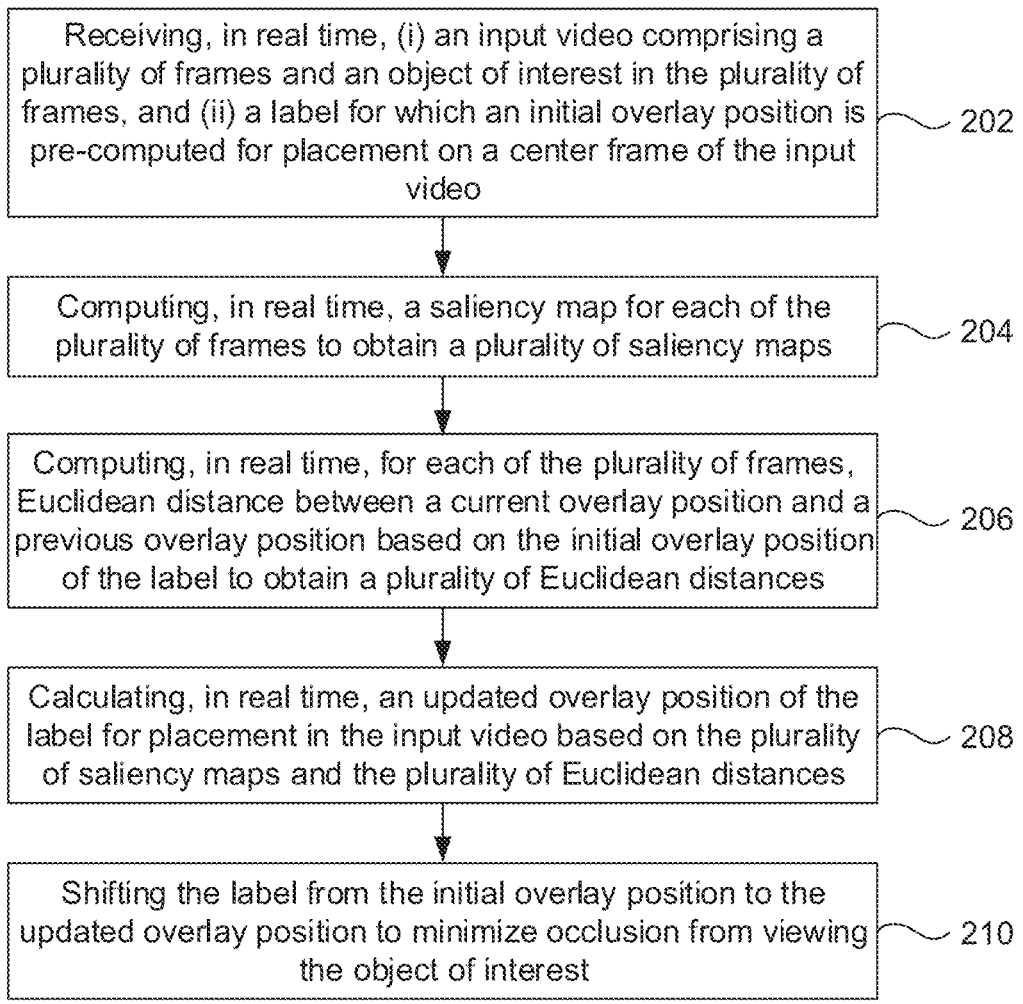
FIG. 2 illustrates an exemplary flow diagram of a method for real time overlay placement in videos for Augmented Reality (AR) applications using the system of FIG. 1 in accordance with an embodiment of the present disclosure.

FIG. 2, with reference to FIG. 1, illustrates an exemplary flow diagram of a method for real time overlay placement in videos for Augmented Reality (AR) applications using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram as depicted in FIG. 2. Prior to receiving input video in real time (also referred as 'real-time' and may be interchangeably used hereinafter), the system 100 and associated method takes as input a number of parameters specified by user(s), namely, k, $\lambda$, $\Sigma$, $O_h$ and $O_w$ where:

1) k: The number of frames to skip processing. The technique/method of the present disclosure runs every k frames. If k=1, the method of the present disclosure is run on every frame. Likewise, if k=2, the method is run on every alternative frame.
2) $\lambda$ controls the temporal coherence of subsequent overlays. A small value of means that the overlay is likely to be placed in a less salient region, but it will also be subject to a lot of jitter. A high value of A reduces the jitter, but also restricts the movement of overlay.
3) $\Sigma$: The search space sampling parameter. It uniformly samples pixels in the 2-dimensional image space. For example, consider $u_w$ and $u_h$ to be the frame width and height respectively, which are the dimensions of search space in our context. Then $u_h/\Sigma$ and $u_w/\Sigma$ pixels are skipped in respective image dimensions.
4) $O_h$, $O_w$: Overlay height and overlay width respectively.

It may not be feasible for the technique or method of the present disclosure to search all pixel values for calculating the best overlay position. The saliency map has discrete values, so it may not be possible to use optimization techniques such a stochastic gradient descent, and the like. A linear search through all the pixels is prohibitively expensive. In the present disclosure, a uniform sampling approach is taken. Some other intermediate variables computed by the method and system 100 of the present disclosure are as follows:

a) $X_P$; $Y_P$: Optimal position of the overlay in the previous iteration. This is initialized to the center of the frame.
b) X; Y: Optimal position of the overlay computed in the current iteration.
c) SM: Saliency map computed using convention computation technique(s) (e.g., refer 'Radhakrishna Achanta, Sheila Hemami, Francisco Estrada, and Sabine Susstrunk, "Frequency-tuned salient region detection," in Computer vision and pattern recognition, 2009. cvpr 2009. ieee conference on. IEEE, 2009, pp.

1597-1604.'—also referred as Achanta et al. or convention visual saliency technique and may be interchangeably used herein).

d) P: A set of sampled pixels from the search space.

e) $F_w$; $F_h$: Frame width and height respectively of the video frames.

Figure 3:
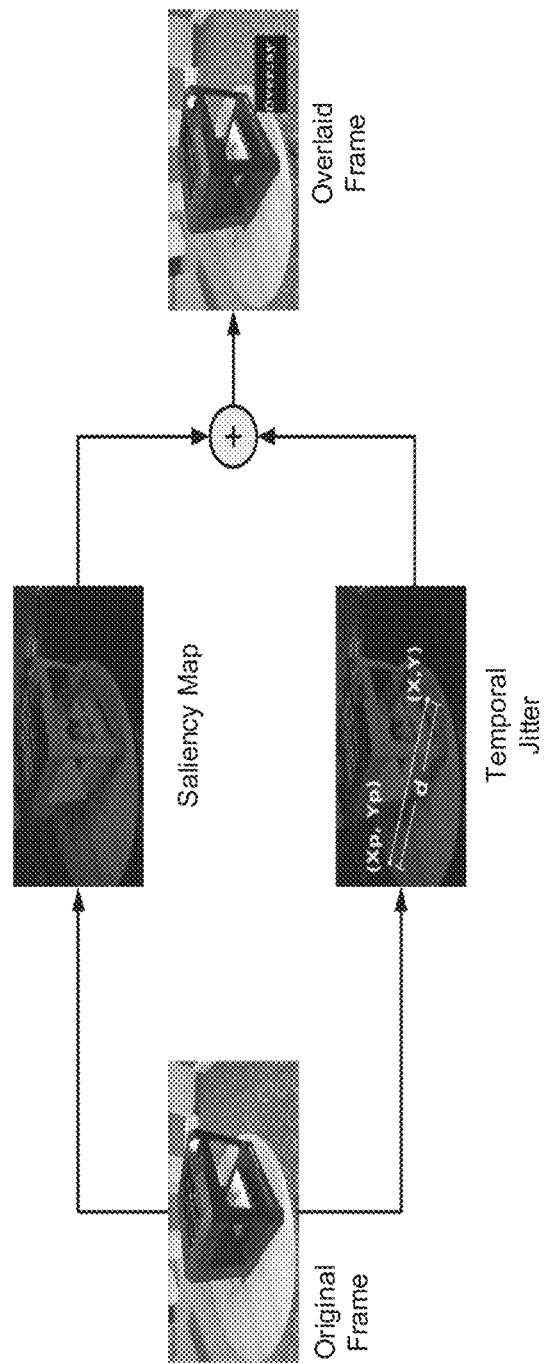
FIG. 3 depicts a block diagram for real time overlay placement in the input video by computing saliency maps and Euclidean distances in accordance with an embodiment of the present disclosure.

The above description is better understood by way of following steps described of FIG. 2. In an embodiment of the present disclosure, at step 202, the one or more hardware processors 104 receive in real time (i) an input video comprising a plurality of frames and an object of interest in the plurality of frames, and (ii) a label for which an initial overlay position is pre-computed for placement on a center frame of the input video. In an embodiment, the label comprises a label height and label width. In an embodiment of the present disclosure, input video is depicted in FIG. 3. The label with initial overlay position (e.g., label being or to be placed on a center frame of the input video) is also received as an input (not shown in FIGS. 2 and 3). Upon receiving the input video and the label, at step 204, the one or more hardware processors compute in real time, a saliency map for each of the plurality of frames to obtain a plurality of saliency maps. An exemplary saliency map is depicted in FIG. 3. In the present disclosure, the system 100 computes a saliency map for each frame present in the input video. In other words, there will be one saliency map for each corresponding frame of the input video. So the saliency map computation is iteratively performed until a last frame of the input video to obtain the plurality of saliency maps.

At step 206, the one or more hardware processors 104 compute, in real time, Euclidean distance between a current overlay position and a previous overlay position based on the initial overlay position of the label to obtain a plurality of Euclidean distances. The Euclidean distance computation is iteratively performed until a last frame of the input video to obtain the plurality of Euclidean distances. In other words, Euclidean distance is computed for each of the plurality of frames. In other words, there will be one Euclidean distance for each corresponding frame of the input video as is the case of saliency map computation. An exemplary Euclidean distance computation is depicted in FIG. 3. In the present disclosure, the Euclidean distance is computed for each of the frames for controlling temporal jitter in a position of the label to be placed in the input video. The controlling of temporal jitter happens in real time as the input video is received and processed in real-time.

Upon computing the plurality of saliency maps and the plurality of Euclidean distance, at step 208, the one or more hardware processors 104 calculate, in real time, an updated overlay position of the label for placement in the input video based on the plurality of saliency maps and the plurality of Euclidean distances. In other words, the updated overlay position of the label is computed by combining the plurality of saliency maps and the plurality of Euclidean distances as depicted in FIG. 3. It is to be noted that although steps 204 and 206 are performed sequentially, the steps of (i) computing saliency map for each of the plurality of frames and (ii) computing, for each of the plurality of frames, Euclidean distance between a current overlay position and a previous overlay position can be concurrently performed. This can further ensure computation in lesser time that can result in better or optimal utilization of the resources. Moreover, upon calculating the updated overlay position, the system 100 (or the one or more hardware processors 104) shift the label from the initial overlay position to the updated overlay position to minimize (or reduce) occlusion from viewing the object of interest at step 210. Alternatively, the view also ensures that it is occlusion free when the label is shifted from the initial overlay position to the updated overlay position. In the present disclosure, a plurality of pixels corresponding to Euclidean distance between the current overlay position and the previous overlay position that is within a predefined threshold range are selected for shifting the label from initial overlay position to the updated overlay position. In other words, one or more pixels whose Euclidean distance between a current overlay position and a previous overlay position is within a predefined threshold range (also referred as 'a pre-defined threshold' and may be interchangeably used hereinafter) are selected for shifting the label from its initial overlay position to the updated overlay position calculated by the system 100 in real time. The updated overlay position comprises information pertaining to the label which has a label height and a label width (e.g., in this case the width and height can either be same as the initial width and height associated with initial overlay position or can vary depending upon the selection of the plurality of pixels). An exemplary overlaid frame is depicted in FIG. 3. More specifically, FIG. 3, with reference to FIGS. 1-2, depicts a block diagram for real time overlay placement in the input video by computing saliency maps and Euclidean distances in accordance with an embodiment of the present disclosure.

In a nutshell, the steps 202 till 208 are explained as below for better understanding:

The method of the present disclosure runs on say, every k frames. For a given frame, visual saliency map (also referred as saliency map and may be interchangeably used hereinafter) using a pseudo code (e.g., SaliencyMapComputation). The system 100 then iterates through the pixel values provided in the search space (e.g., refer Σ-search space sampling parameter) and sums up the saliency values given by the map in a hypothetical box of size $O_h$, $O_w$. In the present disclosure, pixel value with the lowest sum is picked as an ideal candidate suggesting lowest salience. The overlay is shifted if the Euclidean distance, d, between previous position and current position scaled by λ (which is referred as predefined threshold range or predefined threshold) is as low as possible. To combine the constraints posed by both low saliency and temporal jitter, the present disclosure formulates an optimization problem, as follows:

$$\underset{(X,Y)}{\text{minimize}} \; S((X, Y)) + \lambda d((X, Y); (X_p; Y_p))$$

$$\text{subject to } X \leq F_W - O_w, X \geq 0 \quad (1)$$
$$Y \leq F_h - O_h, Y \geq 0$$

Below is an exemplary pseudo code of the technique/method of the present disclosure:

1. $(X_P; Y_P)$=(frame_width/2, frame_height/2)
2. For every $k^{th}$ frame
3. SM=SaliencyMapComputation(frame)
4. for (x,y)∈P
5. L={(a,b)|x≤a≤x+$O_w$, y≤b≤y+$O_h$}
6. $s_{x,y}=\Sigma_{(a,b)\in L}$SM(a, b)
7. $d_{x,y}$=λ×Distance((X, Y), ($X_P$, $Y_P$))
8. $s_{min}=\min(s_{x,y}+d_{x,y})$
9. (X, Y):=arg_min($s_{x,y}$)
10. ($X_P$, $Y_P$):=(X, Y)//Use linear interpolation for overall transition In the above pseudo code, for executing the line (or command or program code) 'SM=SaliencyMapComputation(frame)', conventional technique of Saliency Map computation may be referred (e.g., refer 'Radhakrishna Achanta, Sheila Hemami, Francisco Estrada, and Sabine Susstrunk, "Frequency-tuned salient region detection," in Computer vision and pattern recognition, 2009. cvpr 2009. IEEE conference on. IEEE, 2009, pp. 1597-1604.'—also referred as Achanta et al. which can be found at—https://infoscience.epfl.ch/record/135217/files/1708.pdf). More specifically, for better understanding of saliency map computation—section 3.2 of the above reference of Achanta et al. including equations (1), (2), (3) and (4) can be referred, in one example embodiment.

Experiments and Results

Experiments involved subjects (e.g., 25 researchers, 10 female and 15 male in the age groups 25-34 to test the method/pseudo code) to view the object under inspection—3D printer through a tablet. A set of subjective and objective metrics were captured to evaluate (a) user experience and (b) placement of overlays. In all the experiments, a label with dimension 50×50 was used which could be customized as per users' needs. The experiments were carried on a Nexus® 6 android phone and a Nexus® 9 tablet. Users were tasked to rate the following parameters in the scale of 1 to 5. Thereafter, mean opinion score was captured. The metrics that were used are: (i) position of the overlay, (ii) low jitter in the overlay, (iii) color of the overlay box and text, and (iv) an overlay responsiveness.

The present disclosure used DIEM dataset (e.g., refer 'Parag K Mital, Tim J Smith, Robin L Hill, and John M Henderson, "Clustering of gaze during dynamic scene viewing is predicted by motion," Cognitive Computation, vol. 3, no. 1, pp. 5-24, 2011.'—'http://pkmital.com/home/wp-content/uploads/2010/03/Mital_Clustering_of_Gaze_During_Dynamic_Scene_Viewing_is_Predicted.pdf'), to evaluate the method of the present disclosure. Videos of resolution 1280×720 were taken from the dataset for conducting experiments by the present disclosure. This dataset consisted of variety of videos from different genres of advertisements, trailers and Television-series. Also with eye movements, this dataset provided detailed eye fixation saliency annotations.

Figure 4:
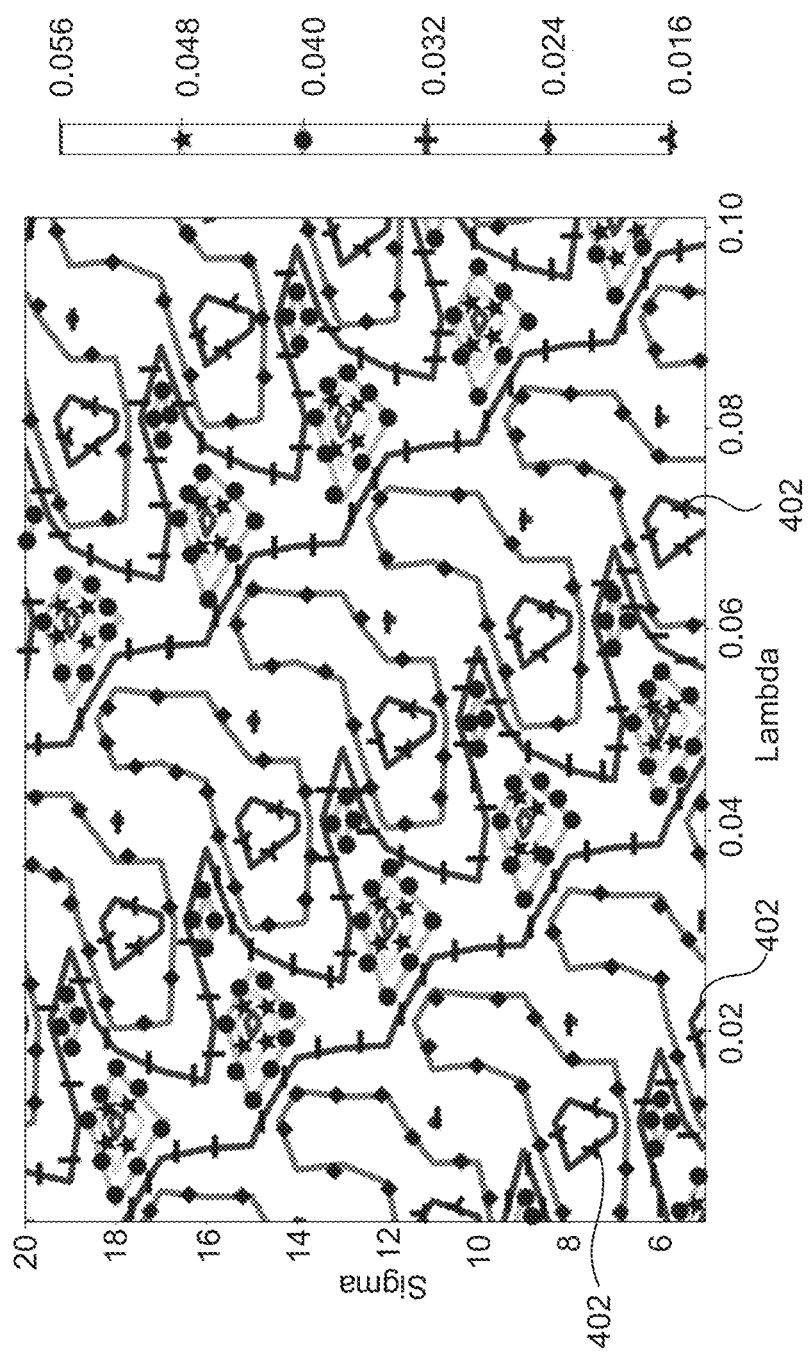
FIG. 4 depicts a graphical representation illustrating variation of average label occlusion over saliency (LOS) score with changes in A and E as a contour plot in accordance with an embodiment of the present disclosure.

During the experiments, the values of parameters and E were empirically found from grid search (known in the art), on the DIEM dataset, and its effect on average label occlusion over saliency (LOS) score of overlays (defined and discussed below) over entire video were compared. FIG. 4, with reference to FIGS. 1 through 3, depicts a graphical representation illustrating variation of average label occlusion over saliency (LOS) score with changes in λ and Σ as a contour plot in accordance with an embodiment of the present disclosure. More specifically, FIG. 4 depicts a contour plot of average LOS scores with respect to λ and Σ. It was observed during the experiments that the LOS score is independent of λ and the optimal combination of Σ and λ is (5, 0.021) (refer line representation with inverse Y like symbol in between the line contour in the FIG. 4 which is denoted by 402 and smaller E is preferred).

Results
Subjective Metrics
Below exemplary table (Table 1) shows the subjective metric scores.

TABLE 1

| Subjective metrics | Value (0-5) |
| --- | --- |
| Position of Overlay | 4.5 |
| Responsiveness of Overlay box | 4.7 |

TABLE 1-continued

| Subjective metrics | Value (0-5) |
| --- | --- |
| Lack of Jitter | 4.2 |
| Color of Overlay box | 3.9 |

From the above Table 1, it is inferred by the present disclosure that position of overlay was rated quite high as 4.5 which was crucial to prevent overlay shadowing the salient regions in a scene. The real-time performance of the above pseudo code of the method in the present disclosure running roughly at 20 frames per second (fps) perhaps resulted in a high score for overlay responsiveness of 4.7. A simple color scheme—white box with black fonts and vice-versa was chosen wherein box color had the transparency set to α=0.5. The color of overlay box depended on the simple adaptive threshold applied on the pixel intensities (luminance channel Y) given by example equation (or expression) 2 as below.

$$\text{Thresh} = \frac{Y_{max} - Y_{min}}{2} \quad (2)$$

The data-driven threshold Thresh, is an average of the difference between the maximum and minimum luminance values of a given scene. If the value is greater than or equal to Thresh, then the overlay box uses a black background and vice-versa (it is to be noted that whole set-up of how the textual labels are overlaid is noted but was demonstrated through experiments). The sample overlay under consideration during experiments just showed contextual information about the entire scene. It was also noted from the demonstration that overlays work in real-time and at the same time were less jittery.

Objective Metrics

Effectiveness of the overlay placement executed by the method/pseudo code of the present disclosure was compared. The evaluation criterion for this comparison was based on the average LOS score occluded by the label with the saliency ground truth of videos. A lesser score shows an effective overlay placement with less occlusion. Label Occlusion over Saliency (LOS) score, S, is defined and expressed as following equation:

$$S = \frac{\sum_{(x,y) \in L} G(x, y)}{\|L\|} \quad (3)$$

where L is set of pixels (x,y) that is occluded by overlay and G is the ground truth saliency map. It was found that the above pseudo code for the method of the present disclosure had an average LOS score of 0.042 and it took 0.021 seconds of time to compute the overlay position.

Embodiments of the present disclosure provide systems and methods for real time overlay (contextual information) placement in videos for AR applications. Based on the above experiments and results it is observed that the present disclosure overcomes imitations of occlusion with object/scene of interest through optimally placing labels aiding better interpretation of scene. The placement of overlays is formulated as an objective function that minimizes (i) visual saliency around the object of interest and (ii) the temporal jitter facilitating coherence in real-time AR applications (particularly executed on (low-end or high end) smartphones, tablet(s), AR based browsers, and the like). Example of AR applications may comprise by are not limited to navigational maps, virtual environments experience as can be visualized in gaming applications, and the like. Other examples of AR based applications comprise but are not limited to, live situational awareness for museum exploratory tasks, industrial inspection and repair operations, advertisement and media, and in tourism industry.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
receiving, in real time, (i) an input video comprising a plurality of frames and an object of interest in the plurality of frames, and (ii) a label for which an initial overlay position is pre-computed for placement on a center frame of the input video (202);
computing, in real time, a saliency map for each of the plurality of frames to obtain a plurality of saliency maps (204);
computing, in real time, for each of the plurality of frames, Euclidean distance between a current overlay position and a previous overlay position based on the initial overlay position of the label to obtain a plurality of Euclidean distances (206), wherein the Euclidean distance for each of the plurality of frames is computed for controlling, in real time, temporal jitter in a position of the label to be placed in the input video; and
calculating, in real time, an updated overlay position of the label for placement in the input video based on the plurality of saliency maps and the plurality of Euclidean distances (208).

2. The processor implemented method of claim 1, wherein the updated overlay position of the label is computed by combining the plurality of saliency maps and the plurality of Euclidean distances.

3. The processor implemented method of claim 1, further comprising shifting the label from the initial overlay position to the updated overlay position to minimize occlusion from viewing the object of interest (210).

4. The processor implemented method of claim 1, wherein a plurality of pixels corresponding to Euclidean distance between the current overlay position and the previous overlay position that is within a predefined threshold range are selected for shifting the label from initial overlay position to the updated overlay position.

5. A system (100), comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to:
receive, in real time, (i) an input video comprising a plurality of frames and an object of interest in the plurality of frames, and (ii) a label for which an initial overlay position is precomputed for placement on a center frame of the input video;
compute, in real time, a saliency map for each of the plurality of frames to obtain a plurality of saliency maps;
compute, in real time, for each of the plurality of frames, Euclidean distance between a current overlay position and a previous overlay position based on the initial overlay position of the label to obtain a plurality of Euclidean distances, wherein the Euclidean distance for each of the plurality of frames is computed for controlling, in real time, temporal jitter in a position of the label to be placed in the input video; and
calculate, in real time, an updated overlay position of the label for placement in the input video based on the plurality of saliency maps and the plurality of Euclidean distances.

6. The system of claim 5, wherein the updated overlay position of the label is computed by combining the plurality of saliency maps and the plurality of Euclidean distances.

7. The system of claim 5, wherein the one or more hardware processors are further configured to shift the label from the initial overlay position to the updated overlay position to minimize occlusion from viewing the object of interest.

8. The system of claim 5, wherein a plurality of pixels corresponding to Euclidean distance between the current overlay position and the previous overlay position that is within a predefined threshold range are selected for shifting the label from initial overlay position to the updated overlay position.

9. One or more non-transitory machine-readable information storage mediums comprising one or more instructions which when executed by one or more hardware processors cause:
receiving, in real time, (i) an input video comprising a plurality of frames and an object of interest in the plurality of frames, and (ii) a label for which an initial overlay position is precomputed for placement on a center frame of the input video;
computing, in real time, a saliency map for each of the plurality of frames to obtain a plurality of saliency maps;
computing, in real time, for each of the plurality of frames, Euclidean distance between a current overlay position and a previous overlay position based on the initial overlay position of the label to obtain a plurality of Euclidean distances, wherein the Euclidean distance for each of the plurality of frames is computed for controlling, in real time, temporal jitter in a position of the label to be placed in the input video; and
calculating, in real time, an updated overlay position of the label for placement in the input video based on the plurality of saliency maps and the plurality of Euclidean distances.

10. The one or more non-transitory machine-readable information storage mediums of claim 9, wherein the updated overlay position of the label is computed by combining the plurality of saliency maps and the plurality of Euclidean distances.

11. The one or more non-transitory machine-readable information storage mediums of claim 9, wherein the instructions which when executed by the one or more hardware processors further cause shifting the label from the initial overlay position to the updated overlay position to minimize occlusion from viewing the object of interest.

12. The one or more non-transitory machine-readable information storage mediums of claim 9, wherein a plurality of pixels corresponding to Euclidean distance between the current overlay position and the previous overlay position that is within a predefined threshold range are selected for shifting the label from initial overlay position to the updated overlay position.

* * * * *